(12) United States Patent
Ferrall et al.

(10) Patent No.: US 7,615,304 B2
(45) Date of Patent: Nov. 10, 2009

(54) SOFC SYSTEMS TO POWER A LIQUID OR GAS FUEL PUMPING STATION

(75) Inventors: Joe Ferrall, Simi Valley, CA (US); Rajiv Doshi, Torrance, CA (US); Chellappa Balan, Niskayuna, NY (US); David A. DeAngelis, Albany, NY (US); Gary D. Mercer, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 526 days.

(21) Appl. No.: 11/163,742

(22) Filed: Oct. 28, 2005

(65) Prior Publication Data

US 2007/0099057 A1    May 3, 2007

(51) Int. Cl.
*H01M 2/00* (2006.01)
*H01M 8/04* (2006.01)
(52) U.S. Cl. .......................... 429/34; 429/23
(58) Field of Classification Search .............. 429/19, 429/22, 23, 26, 32
See application file for complete search history.

(56) References Cited

U.S. PATENT DOCUMENTS

| | | | | |
|---|---|---|---|---|
| 5,482,791 A | * | 1/1996 | Shingai et al. | 429/23 |
| 5,678,647 A | * | 10/1997 | Wolfe et al. | 180/65.3 |
| 6,616,424 B2 | * | 9/2003 | Raiser | 417/411 |
| 2002/0015869 A1 | * | 2/2002 | Suda | 429/19 |
| 2004/0048119 A1 | * | 3/2004 | Iwase | 429/22 |
| 2004/0121207 A1 | * | 6/2004 | Bunker et al. | 429/30 |
| 2005/0112423 A1 | * | 5/2005 | Omoto et al. | 429/20 |
| 2005/0147856 A1 | * | 7/2005 | Albrodt et al. | 429/17 |

* cited by examiner

*Primary Examiner*—Patrick Ryan
*Assistant Examiner*—Muhammad Siddiquee
(74) *Attorney, Agent, or Firm*—Sutherland Asbill & Brennan LLP

(57) ABSTRACT

A fuel cell system for driving a pipeline transmission device. The fuel cell system may include a fuel cell stack in communication with the pipeline, a turbine engine in communication with the fuel cell stack, and a DC motor in communication with the transmission device.

11 Claims, 1 Drawing Sheet

SOFC SYSTEMS TO POWER A LIQUID OR GAS FUEL PUMPING STATION

TECHNICAL FIELD

The present application relates generally to fuel cell systems and more particularly relates to fuel cell systems used to provide motive power for a fuel transmission line pumping station.

BACKGROUND OF THE INVENTION

Fuel transmission lines require pumping stations to transport the liquid or gaseous fuel across long distances. Because the fuel transmission lines are often in remote areas, the availability of electrical power to drive the pumps or the compressors is often limited or completely unavailable. Gas turbines generally are used in such remote areas while electric motors are preferred if a connection to an electrical grid is available.

As is well known, fuel cell systems can convert a fuel or gas stream into electrical power. Fuel cell systems have been considered for use with fuel transmission lines in the past. Known units included phosphoric fuel cells (PAFC) or molten carbonate fuel cells (MCFC) for supplying electricity for pipeline pumping for fuel or compression and co-generation for natural gas. Such known systems generally operated under high pressures and generally required the use of a turbocompressor. The net energy from these systems was DC power used for operating pumps or compressors. These known systems generally have limited efficiency.

There is a desire, therefore, for an improved fuel cell system that can be positioned at remote pumping stations along fuel transmission lines. The improved fuel cell system preferably can provide electrical power and/or mechanical force with improved efficiency while producing a limited amount of undesirable emissions.

SUMMARY OF THE INVENTION

The present application thus describes a fuel cell system for driving a pipeline transmission device. The fuel cell system may include a fuel cell stack in communication with the pipeline, a turbine engine in communication with the fuel cell stack, and a DC motor in communication with the transmission device.

The fuel cell stack may be a solid oxide fuel cell stack. The fuel cell stack may include a number of fuel cell stacks. The fuel cell system further may include a fuel processor in communication with the pipeline and the fuel cell stack. The gas turbine engine may include a compressor for providing compressed air to the fuel cell stack, a turbine for receiving combustion gases from the fuel cell stack, and a driveshaft connecting the compressor and the turbine. The transmission device may be connected to the driveshaft. The DC motor also may be connected to the driveshaft.

The fuel cell system further may include a DC power conditioner in communication with the fuel cell stack and the DC motor. The fuel cell system also may include a heat exchanger in communication with the gas turbine engine and the fuel cell stack. The fuel cell system may include a DC generator in communication with the gas turbine engine and the DC motor such that the DC motor receives power from the fuel cell stack and from the gas turbine engine via the DC generator. The fuel cell system may include a driveshaft positioned between the transmission device and the DC motor.

The present application also describes a method of driving a transmission device for a pipeline with a fluid therein by a hybrid fuel cell system having a fuel cell stack, a gas turbine engine, and a DC motor. The method may include the steps of providing the fluid to the fuel cell stack from the pipeline, providing air to the fuel cell stack from the gas turbine engine, generating power in the fuel cell stack, providing the power to the DC motor, driving the gas turbine with exhaust gases from the fuel cell stack, and driving the transmission device by the DC motor and/or the gas turbine engine.

The hybrid fuel cell system includes a drive shaft in communication with the transmission device and the method may include the step of driving the driveshaft by both the gas turbine engine and the DC motor. The hybrid fuel cell system may include a DC generator in communication with the gas turbine engine and the DC motor and the method may include the steps of generating power by the DC generator and providing the power to the DC motor.

These and other features of the present application will become apparent to one of ordinary skill in the art upon review of the following detailed description of the embodiments when taken in conjunction with the drawings and the appended claims.

DETAILED DESCRIPTION

Figure 1:
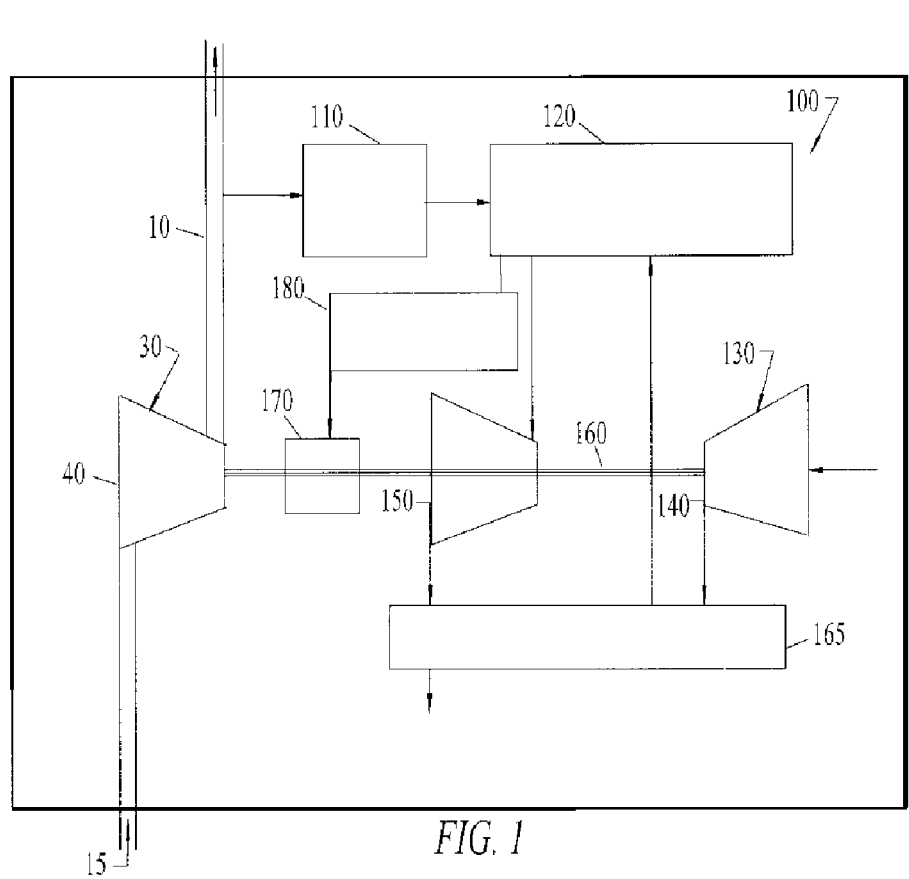
FIG. 1 is a schematic view of a hybrid fuel cell power system for a pipeline station as is described herein.

Referring now to the drawings, in which like numerals refer to like parts throughout the several views, the embodiments described herein are intended for use with existing fuel transmission lines and equipment. Specifically, the embodiments described herein are intended for use with existing pipelines 10. The pipelines 10 may carry natural gas, fuel, or other types of fluids 15. As described above, a number of pumping stations 20 may be positioned along the pipeline 10. Each pumping station 20 may have one or more transmission device 30 in communication with the pipeline 10. The transmission device 30 may be a gas compressor 40 for the transmission of natural gas, a pump for fuels and other liquids, or similar types of devices.

FIG. 1 shows a gas compressor system 100 as is described herein. As will be described in more detail below, the gas compressor system 100 may be a hybrid fuel cell power system that combines both a fuel cell and a gas turbine. For the purposes of this disclosure, the net energy produced by the system 100 may be in the form of mechanical power used to run the compressor 40.

The gas compressor system 100 may include a fuel processor 110 in communication with the pipeline 10. The fuel processor 110 may be a conventional fuel reformer or a similar type of device.

The fuel processor 110 in turn may be in communication with a fuel cell stack 120. The fuel cell stack 120 preferably is a solid oxide fuel cell ("SOFC") stack, but other types of fuel cell systems also may be used herein. The fuel cell stack 120 may in fact include a number of fuel cell stacks aligned in series or otherwise. Each fuel cell stack 120 includes a number of individual fuel cells. Any number of individual fuel cells or stacks may be used herein. The fuel cell stack 120 may or may not be pressurized. The fuel cell stack 120 may have an efficiency of over sixty percent (60%) or more at about 5 MW.

As is known, fuel and air react within the fuel cell stack 120 so as to produce DC power. The spent fuel and air also then may be combusted so as to produce hot combustion gases. These combustion gases may be used for the fuel processor, a fuel preheater, a start up generator, a recuperator, and for generating mechanical power as is described below. Any combination of purposes may be used herein. The combustion gases then may be vented to the atmosphere or used otherwise. The cathode exhaust may be similarly used if not combusted.

The fuel cell stack 120 may be in communication with a gas turbine engine 130. The gas turbine engine 130 generally includes an air compressor 140 and a gas turbine 150 positioned on a common driveshaft 160. A heat exchanger 165 also may be in communication with the compressor 140, the gas turbine 150, and the fuel cell stack 120. The incoming air is compressed in the compressor 140 and then passes through and is heated within the heat exchanger 210. The heated, compressed air is sent to the fuel cell stack 120 so as to react with the fuel from the fuel processor 110. Once reacted and/or combusted, the hot combustion gases exit the fuel cell stack 120 and drive the gas turbine 150. The gas turbine 150 thus rotates the driveshaft 160 so as to drive the air compressor 140 and an external load. The hot combustion gases exit the gas turbine 150, flow back through the heat exchanger 165, and then may be vented to the atmosphere or used otherwise. The combustion gases flowing through the heat exchanger 165 thus heat the incoming airflow.

In this embodiment, a DC motor 170 also may be positioned on the driveshaft 160. The DC motor 170 may be of conventional design. The DC motor 170 may be provided with DC power from the fuel cell stack 120 via a DC power conditioner 180. The DC power conditioner 180 may be of conventional design and may provide spike protection to the DC motor 170. The driveshaft 160 thus may be driven by either or both the turbine 150 and the DC motor 170.

The driveshaft 160 may be directly connected to the gas compressor 40. The driveshaft 160 thus drives the compressor 40 so as to compress the gas within the pipeline 10. As such, the mechanical energy from the gas turbine engine 130 is directly transmitted to the compressor 40 and the DC power generated by the fuel cell stack 120 also is turned into mechanical energy via the DC motor 170. The elements positioned upon the driveshaft 160 may be arranged in any order. Any number of gas compressor systems 100 may be used.

Figure 2:
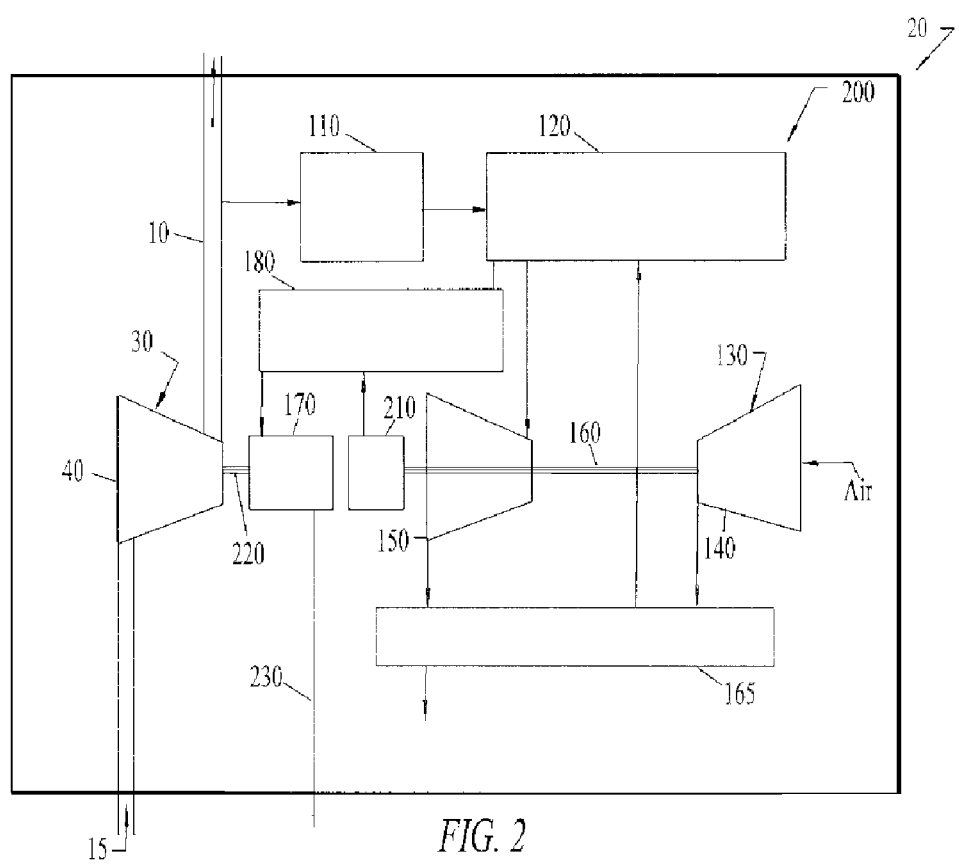
FIG. 2 is a schematic diagram of an alternative embodiment of the hybrid fuel cell power system.

FIG. 2 shows a further embodiment of a gas compressor system 200. The gas compressor 200 generally includes the fuel processor 110, the fuel cell stack 120, the gas turbine engine 130, the heat exchanger 165, the DC motor 170, and the DC power conditioner 180 of the gas compressor system 100 described above. Instead of positioning the DC motor 170 on the drive shaft 160, the gas compressor system 200 includes a separate DC generator 210 positioned on the driveshaft 160. The DC generator 210 may be of conventional design and converts the mechanical energy of the driveshaft 160 into DC power.

The DC generator 210 may be in communication with the DC power conditioner 180 that, in turn, is in communication with the DC motor 170. A second driveshaft 220 thus connects the DC motor 170 with the compressor 40. The DC power generated by the gas turbine engine 130 and the fuel cell stack 120 therefore drives the second driveshaft 210 and the compressor 40.

As a further alternative, the gas compressor system 200 also may be connected to a utility grid where available via a power line 230 connected to the DC motor 170 or otherwise. The power line 230 may serve as a back up system or otherwise supplement the DC power supply. Battery back up also may be used for a limited amount of time.

It should be apparent that the foregoing relates only to the preferred embodiments of the present application and that numerous changes and modifications may be made herein without departing from the general spirit and scope of the invention as defined by the following claims and the equivalents thereof.

We claim:

1. A fuel cell system, comprising:
a transmission device associated with a liquid fuel pipeline;
a fuel cell stack in communication with the same liquid fuel pipeline;
the fuel cell stack generating a combustion gas;
a turbine engine in communication with the fuel cell stack such that the turbine engine is driven by the combustion gas; and
a DC motor in communication with the transmission device and the turbine engine.

2. The fuel cell system of claim 1, wherein the fuel cell stack comprises a solid oxide fuel cell stack.

3. The fuel cell system of claim 1, further comprising a fuel processor in communication with the liquid fuel pipeline and the fuel cell stack.

4. The fuel cell system of claim 1, wherein the gas turbine engine comprises a compressor for providing compressed air to the fuel cell stack, a turbine for receiving the combustion gas from the fuel cell stack, and a driveshaft connecting the compressor and the turbine.

5. The fuel cell system of claim 4, wherein the transmission device is connected to the driveshaft.

6. The fuel cell system of claim 4, wherein the DC motor is connected to the driveshaft.

7. The fuel cell system of claim 1, further comprising a DC power conditioner in communication with the fuel cell stack and the DC motor.

8. The fuel cell system of claim 1, further comprising a heat exchanger in communication with the gas turbine engine and the fuel cell stack.

9. The fuel cell system of claim 1, further comprising a DC generator in communication with the gas turbine engine and the DC motor such that the DC motor receives power from the fuel cell stack and from the gas turbine engine via the DC generator.

10. The fuel cell system of claim 9, further comprising a driveshaft positioned between the transmission device and the DC motor.

11. The fuel cell system of claim 1, wherein the fuel cell stack comprises a plurality of fuel cell stacks.

\* \* \* \* \*